United States Patent [19]

Sawa et al.

[11] Patent Number: 5,002,255
[45] Date of Patent: Mar. 26, 1991

[54] NON-SLIDING GATE VALVE FOR HIGH VACUUM USE

[75] Inventors: Toshio Sawa, Sayama; Norikimi Irie, Tokyo; Yuzo Hayashi, Kawagoe; Toshiro Katagiri, Sakado, all of Japan

[73] Assignee: Irie Koken Kabushiki Kaisha, Tokyo, Japan

[21] Appl. No.: 485,985

[22] Filed: Feb. 27, 1990

[30] Foreign Application Priority Data

Mar. 3, 1989 [JP] Japan .................................... 1-49993
Jan. 8, 1990 [JP] Japan ........................................ 2-424

[51] Int. Cl.⁵ .............................................. F16K 3/10
[52] U.S. Cl. ..................................... 251/193; 251/187
[58] Field of Search ......................... 251/158, 187, 193

[56] References Cited
U.S. PATENT DOCUMENTS

3,343,562  9/1967  Combes ........................... 251/187 X
4,062,515 12/1977  Bobo ................................. 251/187 X
4,721,282  1/1988  Shawver et al. ................ 251/193 X Primary Examiner—John C. Fox
Attorney, Agent, or Firm—Amster, Rothstein & Ebenstein

[57] ABSTRACT

A non-sliding vacuum gate valve comprising a valve housing hermetically sealed to the outside, an opening formed in one of its side walls, and a valve body disposed within the valve housing and adapted to sealingly open or close the valve seat formed around the opening in which the mechanism for opening and closing the valve body sealingly open or close the valve seat is provided outside the valve housing, the mechanism being made to be able to carry out two subsequent movements, one to move the valve body in a direction substantially perpendicular to the valve seat, the other to move the valve body substantially orthogonal to a direction substantially perpendicular to the valve seat with the valve body being spaced apart from the valve.

3 Claims, 4 Drawing Sheets

FIG. 6

NON-SLIDING GATE VALVE FOR HIGH VACUUM USE

BACKGROUND OF THE INVENTION

The present invention relates to a gate valve and more particularly to a non-sliding gate valve for high vacuum use.

Recently, as further integration of semiconductors as well as the variety and complexity of their constitutions, etc. have progressed, the requirements for maintaining cleanliness in the manufacturing environment have come even more stringent.

Gate valves are essential constitutional elements for equipment for manufacturing semiconductors, and the greater part of the mechanism for opening and closing their valve bodies are provided within a vacuum environment. For example, as a mechanism for transferring force to urge the packing of a valve body against the valve seat and to maintain a seal between them mechanisms using a linkage, or types pushing a wedge between them, etc. have been known, and these mechanisms are as a rule provided within a vacuum environment. Further, other link mechanisms may also be provided in the valve rod to actuate the valve body in order to absorb its stroke, and it is not rare to have such mechanisms also provided within a vacuum environment as well.

Moreover, when these mechanisms are provided within a vacuum environment, regardless of whether their operation is rolling or shifting, if frictional movement accompanies their operation minute particles (particles of different materials) are unavoidably produced as a result of the friction, damaging the requirements for a high degree of cleanliness in the vacuum environment, prohibiting the use of such mechanisms. Further, as a countermeasure for decreasing frictional resistance in cases where friction accompanies operation of the gate valves the mechanisms need to be lubricated by some suitable medium, but, since it is very difficult to adopt such a countermeasure within a vacuum environment it is often the case that clogging will occur at the frictional parts if continuous operation takes place at high frequency. In the mechanical device it is also a difficult situation when the mechanical portion includes a frictional element.

SUMMARY OF THE INVENTION

It is therefore an object of the present invention to provide a non-sliding gate valve suitable for use in a vacuum environment where a high degree of cleanliness is required wherein among the mechanisms necessary for actuating its valve body the elements which are accompanied by friction in operation are all provided outside the vacuum environment, with no sliding or rotational parts being provided, and the overall configuration is small.

In accordance with the present invention a non-sliding gate valve is provided for vacuum use comprising a valve housing, the inside of which is sealed from the outside, with an opening formed in one of the side walls of the valve housing, a valve body adapted to open and close a valve seat formed around the opening, a valve body opening and closing mechanism for moving the valve body open and closed in order to open or sealingly close the valve seat formed around the opening of the valve housing, the valve body opening and closing mechanism being constituted to successively move the valve body in a direction substantially orthogonal to the surface of the valve seat and move the valve body in a direction orthogonal to the first-mentioned direction with the valve body spaced from the valve seat.

DETAILED DESCRIPTION OF THE INVENTION

In the drawings two embodiments of the present invention are represented wherein a non-sliding gate valve for use in a vacuum environment is embodied as a gate valve having a rectangular valve opening. Such a gate valve is in great demand at present for semiconductor wafer production lines, and it is also required to maintain a high degree of vacuum and simultaneously be capable of continuous operation at frequent intervals.

Figure 1:
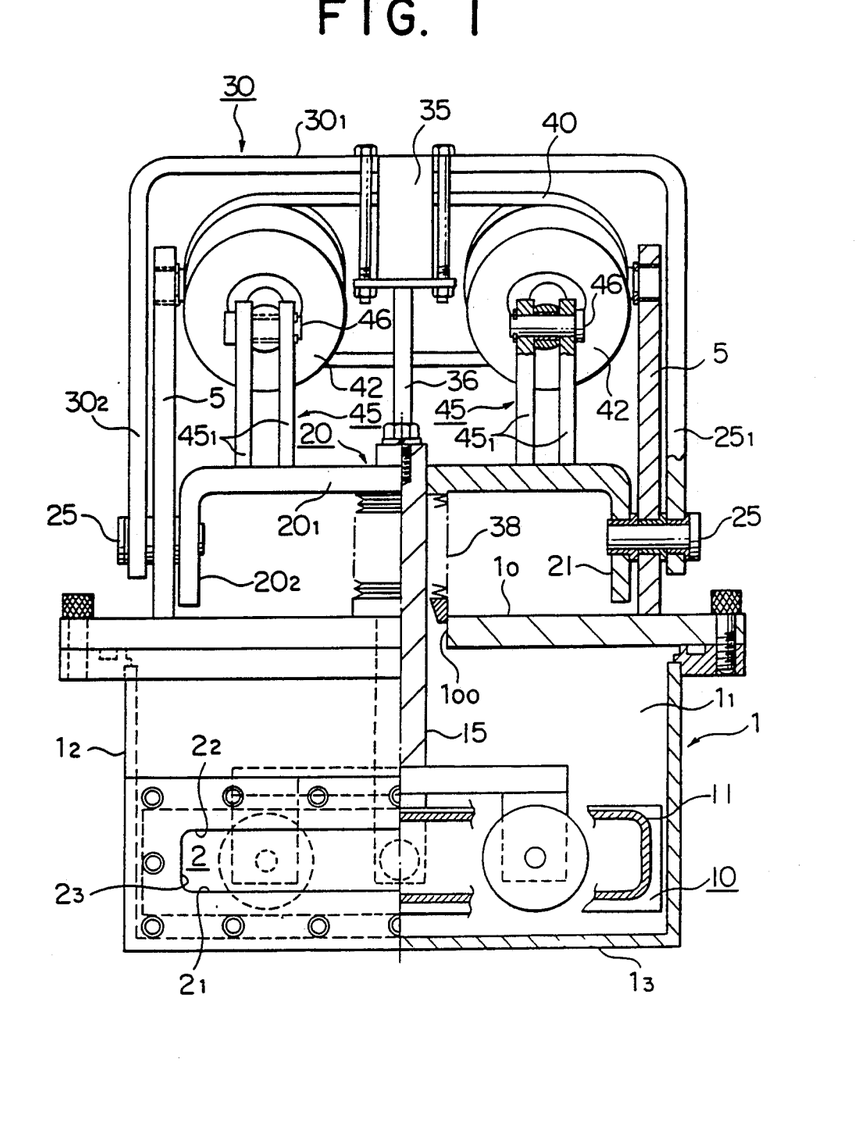
FIG. 1 shows an embodiment of a non-sliding gate valve in accordance with the present invention in state where its valve body is spaced apart from its valve seat with the left half being indicated in a front elevational view and the right half in a vertical sectional view.
Figures 2, 3, 4:
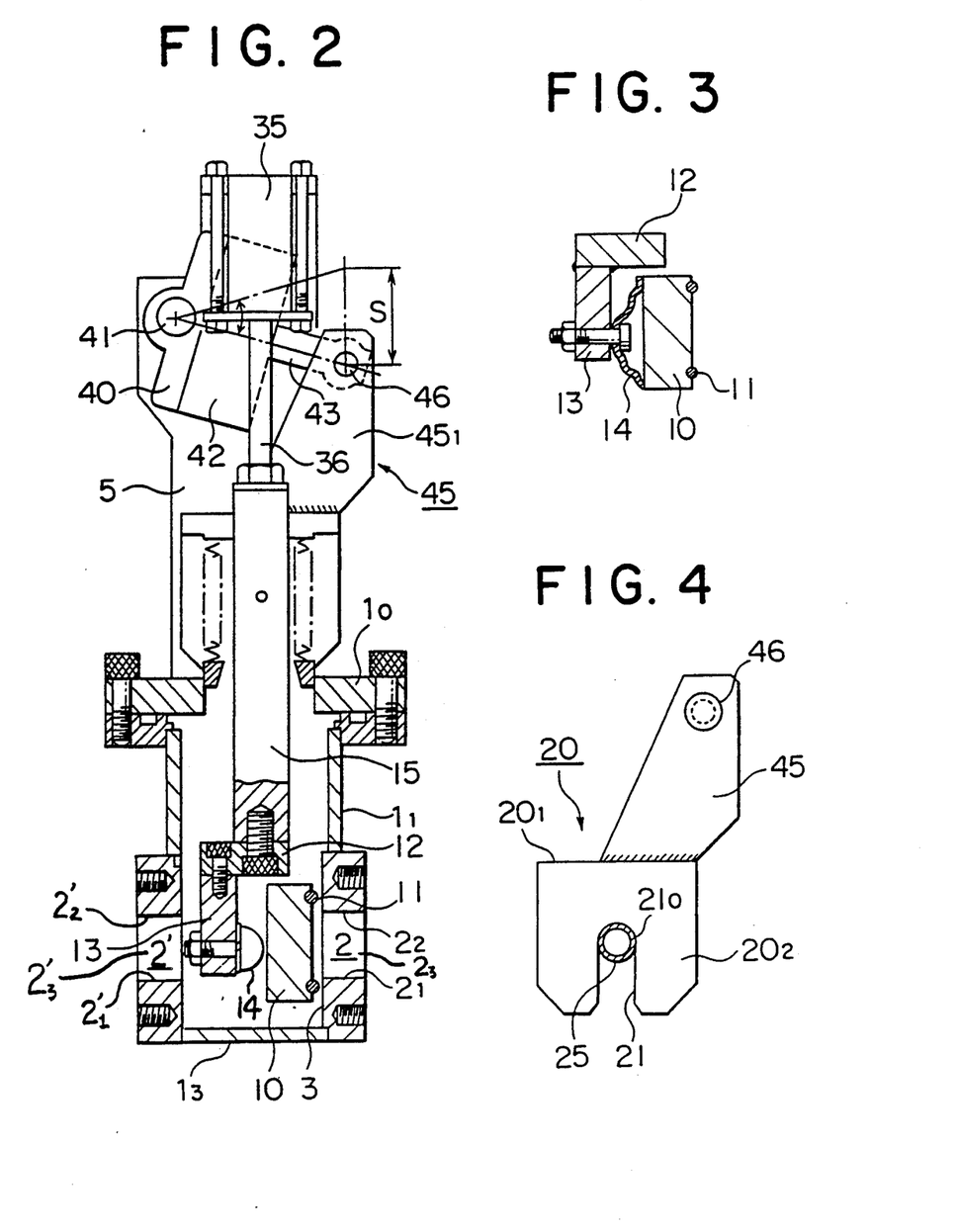
FIG. 2 is a side elevational view of FIG. 1.
FIG. 3 is a sectional view taken along the line III—III in FIG. 1.
FIG. 4 is a sectional view taken along the line IV—IV in FIG. 1.

Referring now to FIGS. 1 and 2 wherein a first embodiment of the gate valve in accordance with the present invention is indicated, a hollow box-like valve housing 1 having a rectangular cross section and which is hermetically sealed is provided the valve housing 1 comprising a top wall $1_0$, two short and two long side walls $1_1$ and $1_2$, and bottom wall $1_3$. In the drawings the bottom wall $1_3$ is shown as being located horizontally, while the side walls $1_1$, $1_2$ are located vertically, the longer side walls $1_1$ being depicted parallel with the plane of the drawings.

As shown in FIG. 1, one of the longer side walls 11 has a rectangular opening 2 formed at its lower portion such that the opening 2 is in symmetry with the vertical center line X—X of the valve housing 1 with its longer edges $2_1$ and $2_2$ being in parallel with the bottom wall $1_3$ and shorter edges $2_3$ being orthogonal thereto. A valve seat 3 is formed around the opening 2 as seen in FIG. 2. The remaining longer side wall $1_1$ has a rectangular opening 2' formed at its lower portion so as to correspond to the opening 2 with the longer edges $2_1'$, $2_2'$ and the shorter edges $2_3'$ corresponding to the longer edges $2_1$, $2_2$ and shorter edges $2_3$ of the opening 2, respectively. On the upper surface of the top wall $1_0$ of the valve housing 1 a pair of substantially rectangular support columns 5 are secured at their lower ends in a spaced relationship so as to be in symmetry with the vertical center line X—X of the valve housing 1 and in parallel with its shorter side walls $1_2$.

Arranged inside the valve housing 1 is a rectangular plate like valve body 10 having a plane configuration corresponding to that of the opening 2 so as to sealingly close it in association with the valve seat 3, one of the surfaces of the valve body 10 being substantially in parallel with the surface of the valve seat 3, with the valve body 10 having an O-ring 11 on the surface confronting the valve seat 3 so as to elastically abut against the valve seat 3 when actuated. In FIG. 2 the valve body 10 is shown in an open state positioned apart from the valve seat 3 so as to open opening 2 of the valve housing 1.

Also within the valve housing 1 is a rectangular plate like valve body support member 12 arranged so as to be in parallel with the longer or upper edge $2_2$ of the opening 2 formed in the longer side wall $1_1$ of the valve housing 1 and spaced apart from the side wall $1_1$. The valve body support member 12 is located horizontally and in symmetry with the vertical center line X—X of the valve housing 1, and at each end thereof a rectangular plate like valve body mounting plate 13 is suspended so as to be in parallel with the valve seat 3 of the valve housing 1. Each of the valve body mounting plates 13 elastically maintain valve body 10 on their surfaces facing the valve seat 3 through a bellows 14 as a spring element so that the valve body 10 is positioned in symmetry with the vertical center line X—X of the valve housing 1 (See FIG. 3).

Further, the valve body support member 12 is secured on its upper surface to a lower end of a valve body actuating rod 15 having a circular cross section. The actuating rod 15 has a center line coinciding with the vertical center line X—X of the valve housing 1, and loosely passes vertically through an opening $1_{00}$ formed in the center of the top wall $1_0$ of the valve housing 1. The rod 15 is fixedly secured near its upper end to the center of a horizontal arm member $20_1$ of an inner swing frame 20 which comprises the horizontal arm member $20_1$ and a pair of vertical leg members $20_2$ respectively depended from each end of the horizontal arm member $20_1$ so as to lie inside, spaced apart from and in parallel to the support columns 5, respectively. Thus the inner swing frame 20 has substantially an inverted U-shaped configuration when viewed in an elevational view. The vertical leg members $20_2$ each have an inverted U-shaped slot 21 formed at the lower portions thereof, the vertical center lines of the slots 21 lying in a vertical plane containing the vertical center line X—X of the valve housing 1 and in parallel with the longer side walls $1_1$ thereof. The semicircular top $21_0$ of the slots 21 are swingably supported on the support columns 5, respectively, by pins 25 secured at the lower portions of the columns 5, respectively, the pins 25 having the same diameter as that of the tops $21_0$ of the slots 21, with the axes of the pins 25 being on a line parallel with the longer side walls $1_1$ of the valve housing 1 (See FIG. 4).

Arranged outside of and substantially surrounding the support columns 5 is an outer swing frame 30 which comprises a horizontal arm member $30_1$ and a pair of vertical leg members $30_2$ each depended from each end of the horizontal arm member $30_1$ so as to be respectively spaced an identical distance from the support columns 5. Thus the outer swing frame 30 has substantially an inverted U-shaped configuration when viewed in an elevational view, the vertical leg members $30_2$ being respectively swingably mounted to the the respective pins 25 which are secured to the support columns 5, respectively.

Further, on a lower surface of the horizontal arm member $30_1$ of the outer swing frame 30 an air cylinder 35 is vertically secured by its cylinder end, the center axis of the cylinder 35 coinciding with the vertical center axis of the valve housing 1, and its piston rod 36 is secured at its lower end to the upper end of the valve body actuating rod 15 which is secured at its upper portion to the horizontal arm member $20_1$ of the inner swing frame 20. Disposed between the inner periphery of the opening $1_{00}$ formed in the top wall $1_0$ of the valve housing 1 and the under surface of the horizontal arm member $20_1$ of the inner swing frame 20 is a bellows 38 as a seal element loosely surrounding the valve body actuating rod 15. The respective ends of the bellows 35 are sealingly secured to the inner periphery of the opening $1_{00}$ and the horizontal arm member $20_1$, respectively, so that the inside of the valve housing 1 is maintained air tight.

Disposed between the support columns 5 near their upper end portions is a substantially elliptical plate-like air cylinder support plate 40 swingably supported thereto by air cylinder rotating shafts 41, respectively, the center lines of which lie in an identical horizontal line. A pair of air cylinders 42 are secured at their cylinder ends to the air cylinder support plate 40 orthogonally thereto and arranged respectively at each side of the air cylinder 35. The piston rods 43 of the air cylinders 42 are respectively swingably connected at their free ends near the upper portions of piston rod support members 45 by pins 46, respectively, and the piston rod support members 45 are arranged in symmetry with the vertical center line X—X of the valve housing 1 and comprise, respectively a pair of substantially rectangular plates $45_1$ secured at their lower ends to the upper surface of the horizontal arm member $20_1$ of the inner swing frame 20.

The following is an explanation of the operation of the first embodiment of the gate valve in accordance with the present invention having a constitution as explained above and as shown in the drawings.

First, FIGS. 1 and 2 indicate the gate valve after completing the first stage of opening or beginning the second stage of closing the valve body 10 wherein the valve body 10 is kept apart from the valve seat 3 so as to communicate the openings 2, 2' formed in the valve housing 1 with each other. In this state the valve body 10 is spaced apart from the valve seat 3 and lies opposite thereto, and the piston rods 36 and 43 of air cylinders 35 and 42, respectively, are all at maximum stroke. However, at the second stage of opening, upon actuation of the air cylinder 35 to retract its piston rod 36 upwards as viewed in FIGS. 1 and 2 by a stroke S, the valve body actuating rod 15 secured to this piston rod 35 through the inner swing frame 20 causes the valve body 10 to be raised upwards through the valve body support member 12, valve body mounting plates 13, and bellows 14 so that the the valve body 10 is raised to a position where it does not interfere with the openings 2, 2' of the valve housing 1, bringing the valve body 10 into a completely open position. In this case, the inner swing frame 20 integral with the valve body actuating rod 15 is raised upwards with the slots $2_1$ formed in its vertical legs $20_2$ being guided by the pins 25, respectively, and simultaneously the air cylinders 42 having their piston rods 43 connected to the piston rod support members 45 through the pins 46, respectively, cause the air cylinder support plate 40 which mounts the air cylinders 42 to be rotated relative to the support columns 5 through the air cylinder rotating shafts 41, respectively.

Inversely, in order to operate the valve body 10 from this perfect open state to close the valve seat 3 for the purpose of preventing mutual communication between the openings 2 and 2' formed in the valve housing 1 the valve body 10 is first brought into the state as shown in FIGS. 1 and 2 by the actuation of the air cylinder 35 through its piston rod 36, valve body actuating rod 15, valve body support member 12, valve body mounting plate 13, and bellows 14. In this first state, the piston rod 36 of the air cylinder 35 is at the end of its elongation stroke, the bottoms $21_0$ of the slots 21 respectively formed in the vertical leg members $20_2$ of the inner swing frame 20 lie on the pins 25, respectively, and the piston rods 43 of the air cylinders 42 are at the ends of their elongating strokes. At this point, as the second stage of closing, upon actuation of the air cylinders 42 to retract their piston rods 43, the piston rods 43 cause the inner swing frame 20 to rotate through the piston rod support members 45 in a counterclockwise direction as viewed in FIG. 2. Therefore, the valve body 10 which has been in the state shown in FIGS. 1 and 2 is urged against the valve seat 3, strongly pressing the O-ring 11 mounted to the valve body 10 upon the valve seat 3, forming perfect seal between the valve body 10 and the valve seat 3 to completely block the communication between the openings 2, 2' formed in the valve housing.

Inversely, in order to operate the valve body 10 to open the valve seat 3 which is closed by the valve body 10, the air cylinders 42 are first actuated so that their piston rods 43 are extended to their maximum strokes to bring them into the sate shown in FIGS. 1 and 2. Thereafter, as the second stage of opening the air cylinder 35 is actuated to retract its piston rod 36 so that the valve body 10 is raised vertically.

As mentioned above, in the first embodiment of the gate valve in accordance with the present invention, in order to open or close the openings 2, 2' formed in the valve housing 1 for the purpose of establishing or ceasing the communication between them. it is necessary for two kinds of movements to be imparted to the valve body 10. That is, one is the movement to move the valve body 10 from or to the position where it is opposite the openings 2, 2' as shown in FIG. 2, and the other is the movement to raise or lower the valve body 10 from or to this position where the valve body 10 is perfectly separated from the openings 2, 2'. These movements are both carried out by a valve body opening-closing mechanism located outside the valve housing 1, i.e. comprising the inner and outer swing frames 20 and 30, air cylinders 35 and 42, and elements connecting the above members with each other. Also, during these movements no relative frictional movement occurs between the valve body 10 and valve seat 3 within the valve housing 1. Therefore, the inside of the valve housing 1 can always be kept clean.

Further, among these movements, the movement to raise or lower the valve body 10 calls for a force equal to, in the case where the inside of the valve housing 1 is a vacuum, the sum of the force at the side that the valve body 10 is drawn into the valve housing 1 determined by the effective diameter of the bellows 38 for sealing and the pressure difference between the outside and inside of the valve housing 1, and the weights of the valve body 10 as well as the valve body actuating rod 15, and the sum is added or subtracted by the spring reactive force of the bellows 38. In the case where the inside of the valve housing 1 is atmospheric, the force is reduced by an appropriate degree, but, since at any rate such force is relatively small, the inner diameter of the air cylinder 35 for holding the valve body 10 at a definite position or moving can be relatively small.

Moreover, among the movements for opening or closing the valve body 10, the movement to move it upwards or downwards has an upwards or downwards stroke which is determined by the dimension of the openings 2, 2' formed in the valve housing 1 in the vertical direction, that is, the dimension corresponding to the shorter edge $2_2$ of the rectangular openings 2, 2'. In general, this stroke is not too large when the upwards or downwards stroke coincides with the direction of the shorter edge $2_2$ of the rectangular opening 2 as in the embodiment shown.

Next, among the movements of the valve body 10, in the one to urge the valve body against the valve seat 3, since the O-ring 11 as a seal packing must be pressed to deformation for keeping a perfectly airtightseal, the air cylinders 42 must have a driving force comparatively larger than that of the first-mentioned movement although their strokes can be small. In a gate valve having rectangular openings as in the embodiment shown, since the force is on the order of 200 kg for a small size valve, or 700 to 800 kg for a larger one, air cylinders 42 havings a larger inner diameter and a shorter stroke are required.

In the above embodiment the valve seat 3 is indicated as being vertical, but if it is shaped so as to have a slight inclination relative to the vertical plane, at the time of closing the valve body 10, the O-ring 11 will abut against the valve seat 3 in a slightly inclined state so that the seal condition can be made more reliable.

The opening or closing movement between the valve body 10 and the valve seat 3 or the up and down movement of the valve body 10 is carried out by the air cylinders 42 or 35 therefore, with either both sides of their pistons being adapted to be pressurized or released under the use of a restoring spring.

Further, although the above embodiment has been explained for a vertically arranged valve housing it is also possible that the various actuating mechanisms may be arranged upsidedown in conjunction with the embodiment shown for convenience in laying out the manufacturing line for the production of semiconductor wafers or for convenience in handling. In this case expressions above such as up and down used for the embodiment shown may be reversed, but there is no difference in fundamental operation. However, among the vertical loads applied to the valve body actuating rod 15, the relationship between the load due to the pressure difference between the inside and outside of the valve housing 1 and the weights of the valve body 10 and the valve body actuating rod 15 is not a sum, but rather a difference instead. Nevertheless, it is small in magnitude with no significant difference occurring to influence the fundamental constitution, and it is generally possible to manage with an identical design.

In order to mount the valve body 10 to the valve body mounting plate 13 the bellows 14 is used between them as a spring means. This constitution is aimed at equalizing the force pressing the O-ring 11 mounted to the valve body 10 on the valve seat 3 over the whole length of the O-ring 11 , and it is necessary in a gate valve having rectangular openings as in the embodiment shown in order that the force applied centrally to the valve body mounting plate 12 is distributed uniformly along the length of the opening 2. In this case it is also necessary to take into consideration the uniform distribution of force in the vertical direction of the opening 2, because, if there is unevenness in the contact condition between the O-ring 11 and the valve seat 3 it is necessary for the O-ring 11 to deform to assure a sufficient airtight state even at lower contact pressure portion. However, if there is unnecessary deformation at the larger contact pressure portions of the O-ring 11 such portions will not only have a tendency to wear, but unnecessarily large compression forces will be required as a whole.

Results of experiments comparing this embodiment with a conventional gate valve confirmed that in the former the compression force necessary to maintain the O-ring 11 in a uniform contact condition is reduced by about 50% compared with the latter. Such results allow the gate valve in accordance with the present invention to have reduced dimensions in the actuating mechanisms and the air cylinders and the wear of the O-ring 11 to be suppressed.

Next the second embodiment of the present invention will be explained in reference to FIGS. 5 and 6 wherein those elements that are the same as or similar to those in the first embodiment explained above bear the same reference numbers.

This embodiment has substantially the same valve housing 1 as that of the first embodiment and comprises a top wall $1_0$, longer and shorter side walls $1_1$, $1_2$, and bottom wall $1_3$. As shown in FIG. 5 one of the longer side walls $1_1$ has formed in its lower portion a rectangular opening 2 in symmetry with the vertical center line X—X of the valve housing 1 with its longer edges $2_1$ and $2_2$ being in parallel with the bottom wall 13 of the valve housing 1, and its shorter edges $2_3$ orthogonal thereto, a valve seat 3 being formed around the opening 2 (See FIG. 6). The other of the longer side walls $1_1$ of the valve housing 1 has formed in its lower portion a rectangular opening 2' so as to correspond to the opening 2 with its longer edges $2_1'$, $2_2'$ and shorter edges $2_3'$ corresponding with the longer edges $2_1$, $2_2$, and shorter edges $2_3$ of the opening 2, respectively. Arranged on the upper surface of the top wall $1_0$ of the valve housing 1 are a pair of vertical support columns 5 in symmetry with the vertical center line X—X of the valve housing 1, each of the support columns 5 comprising a pair of plate-like substantially rectangular support plates $5_1$ and $5_2$ spaced a small distance apart from each other, each of the plates $5_1$ and $5_2$ having at their upper portions a narrow pilaster-like part and secured at their lower ends to the top wall $1_0$ of the upper surface of the valve housing 1 so as to be in parallel with its shorter side walls $1_2$.

A plate-like rectangular valve body 10 having a plane configuration somewhat larger than that of the opening 2 formed in the valve housing 1 is arranged within the housing 1 such that one of the surfaces of the valve body 10 is substantially in parallel with the valve seat 3 and is capable of opening or closing the opening 2 in association with the valve seat 3. Mounted on the surface of the valve body 10 opposite the valve seat 3 is an O-ring 11 adapted to abut against the valve seat 3 (See FIG. 6). In the drawings the valve body 10 is shown in a state of opening the opening 2 with the valve body 10 being spaced apart from the valve seat 3 of the valve housing 1. As apparent from FIGS. 5 and 6 a depression $10_1$ having substantial depth is formed in the surface of the valve body 10 remote from the valve seat 3, the depression $10_1$ having a plane configuration similar to that of the valve body 10, but of somewhat smaller dimensions. Disposed within the depression $10_1$ is a plate-like substantially rectangular valve body pressing member 13' which has a plane configuration similar to that of the depression $10_1$, but somewhat smaller in dimensions than that of the depression $10_1$ and has a substantial thickness with its outer periphery being spaced from the inner periphery of the depression $10_1$ by a small amount and its bottom being similarly spaced apart from the bottom of the depression $10_1$ by a small amount. In the bottom of the valve body pressing member 13' a central circular cavity $13_1'$ having a substantial depth is formed, and a bolt 50 having a semi-spherical head $0_1$ has its stem introduced into the cavity $13_1'$ to pierce through the center of the valve body pressing member 13' such that the apex of the head $50_1$ of the bolt 50 abuts against the bottom of the depression $10_1$. The valve body 10 and the valve body pressing member 13' are elastically connected to each other by connecting the inner periphery of the depression $10_1$ of the valve body 10 and the outer periphery of valve body pressing member 13' by means of several coil springs 14' as elastic means.

A valve body actuating rod 15 having its central axis lying in the vertical center line X—X of the valve housing 1 is introduced from the outside into the valve housing 1 by being loosely passed through a cylindrical opening $1_{00}$ formed in the top wall $1_0$ of the valve housing 1 and the lower end of the valve actuating rod 15 is centrally secured to the valve body pressing member 13' at its back surface by the bolt 50 and a nut. The valve body actuating rod 15 passed through the opening $1_{00}$ formed in the top wall $1_0$ of the valve housing 1 is adapted near its upper end portion to loosely pass through a cylindrical opening formed in the middle of a horizontal arm member $20_1$ of a swing frame 20. The swing frame 20 comprises the horizontal arm member $20_1$ and a pair of vertical leg members $20_2$ each vertically depending from either end of the arm member $20_1$, the vertical leg members $20_2$ being respectively positioned centrally between the support plates $5_1$ and $5_2$ constituting the respective support columns 5 and in parallel thereto. Thus the swing frame 20 has substantially an inverted U-shaped configuration when viewed in an elevational view. The vertical leg members $20_2$ of the swing frame 20 are spaced at their lower ends from the upper surface of the top wall $1_0$ of the valve housing 1 and swingably connected to the pair of rectangular support plate $5_1$ and $5_2$ at their lower portions, respectively, by having pins 25 loosely passed therethrough, respectively, which are mounted to the rectangular support plates $5_1$ and $5_2$ so as to be in parallel with the top wall $1_0$ of the valve housing 1.

Centrally secured on the upper surface of the horizontal arm member $20_1$ of the swing frame 20 is an air cylinder 35, vertically attached so that the bottom of the cylinder faces upwards and so as to have its central axis coincide with the vertical center line X—X of the valve housing 1, its piston rod 36 being secured to the upper end of the valve body actuating rod 15. In order to maintain the gap formed between the cylindrical opening $1_{00}$ formed in the top wall $1_0$ of the valve housing 1 and the valve body actuating rod 15 in an airtight condition relative to the valve housing 1, a bellows 38 is arranged between the outside of the top wall $1_0$ of the valve housing 1 and the valve body actuating rod 15 so as to loosely surround the latter, each end of the bellows 38 being sealingly secured to the top wall $1_0$ and the valve body actuating rod 15 respectively.

A pair of air cylinders 40 are secured at their cylinder ends to the support columns 5, respectively, near their upper ends in an identical horizontal line, and their piston rods 41 pass centrally through the other ends of the cylinders 40, respectively, pressing members 42 each having a semi-spherical configuration are connected to the free end of the piston rods 41, and the tops of the pressing members 42 are adapted to abut against the swing frame 20 at the intersecting portions of the center lines of the horizontal arm member $20_1$ and vertical leg members $20_2$ of the swing frame 20, respectively.

Now the operation of the second embodiment having such a constitution as described above will be explained as follows.

Figure 5:
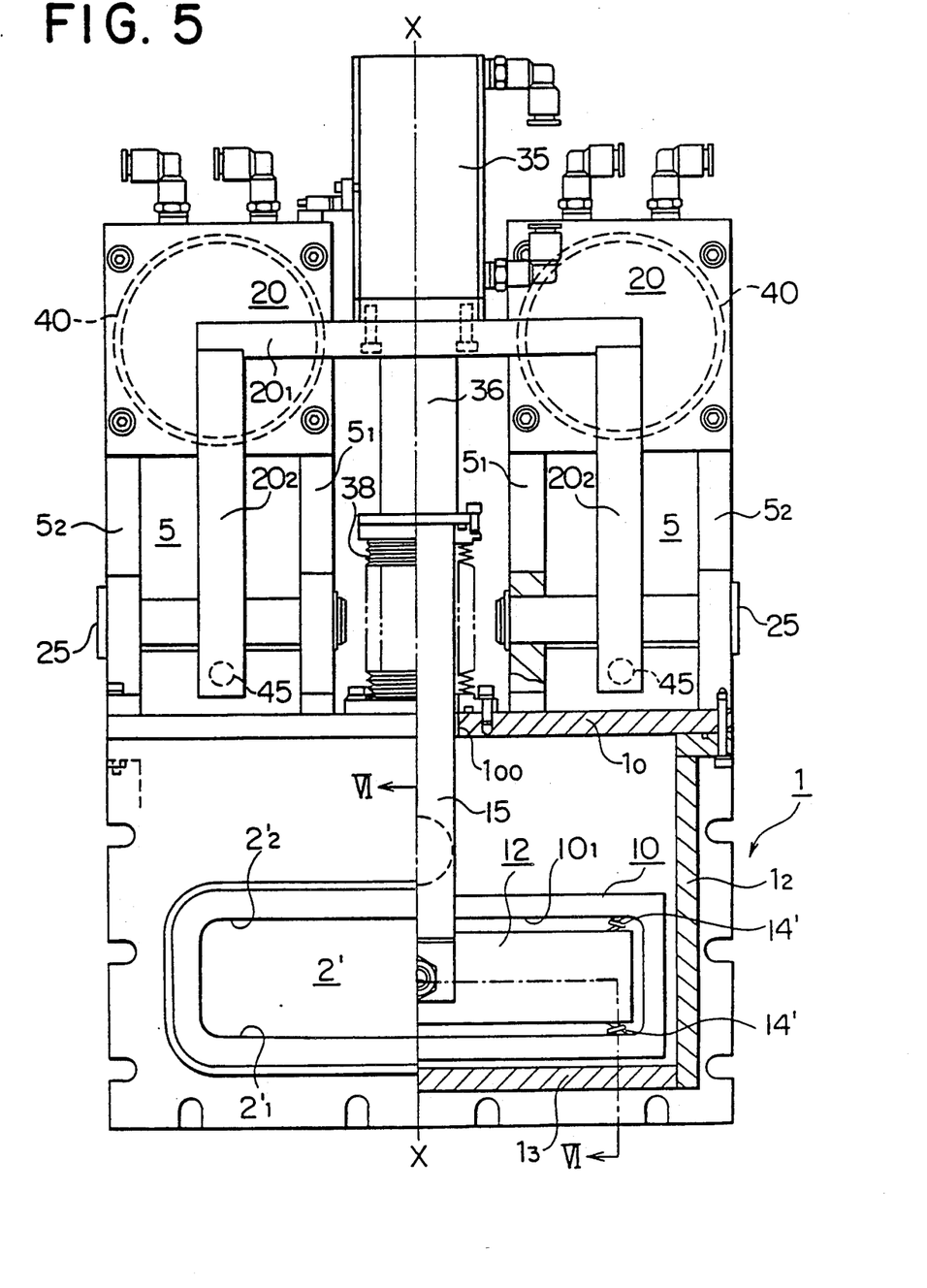
FIG. 5 is a view similar to FIG. 1, but indicating another embodiment of the present invention.
Figure 6:
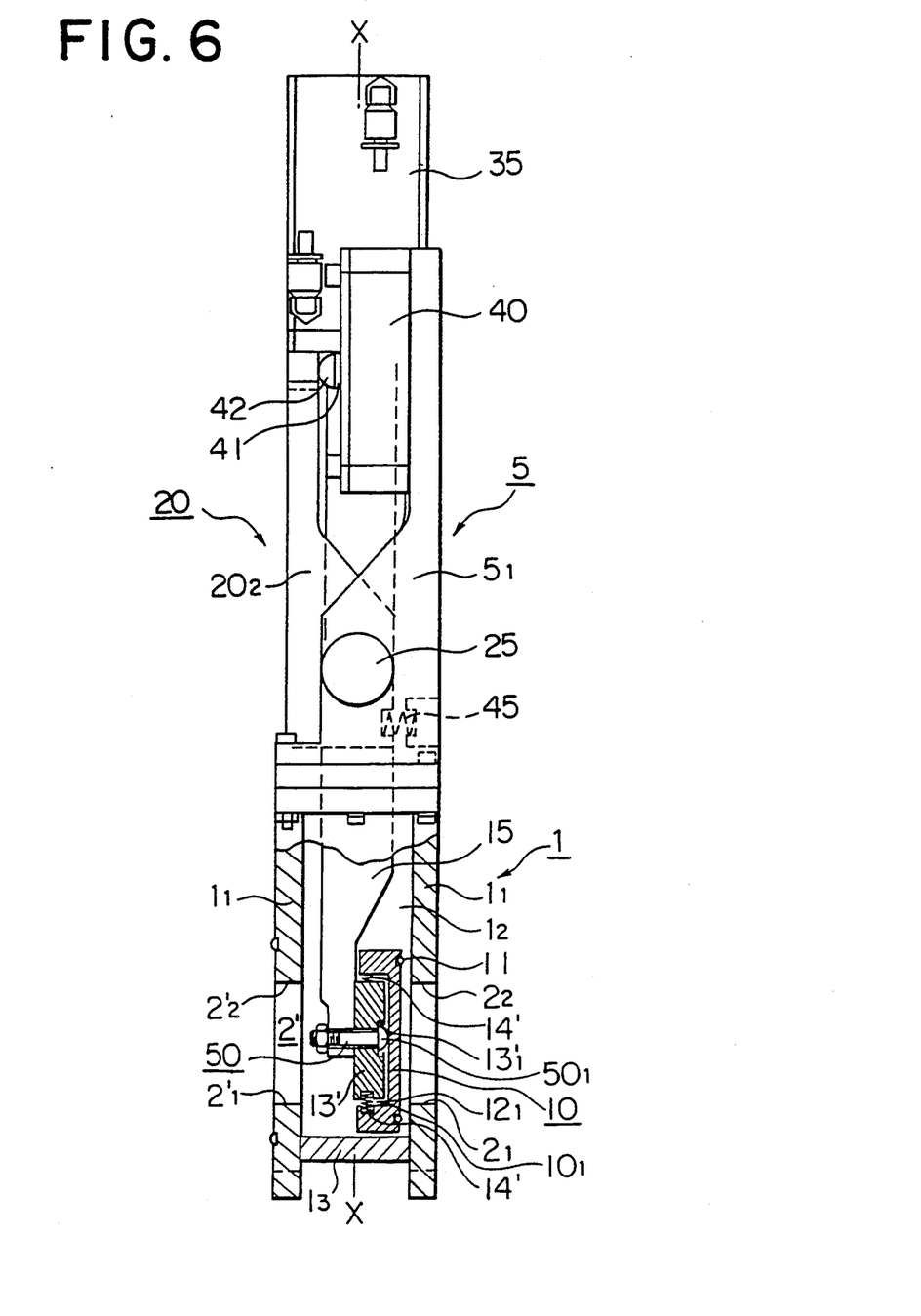
FIG. 6 is a view similar to FIG. 2, but representing the embodiment shown in FIG. 5, partially in section along the line VI—VI in FIG. 5.

FIGS. 5 and 6 show the state of the valve body 10 spaced apart from the valve seat 3 after completing the first stage of opening or beginning the second stage of closing the opening 2. In this state, the valve body 10 is spaced apart from the valve seat 3 and lies opposite thereto. Further, in this state, the piston rod 36 of the air cylinder 35 and the piston rods 41 of the air cylinders 40 are respectively at maximum extended stroke and maximum retracted strokes, respectively. From this state, as the second stage of opening, upon actuation of the air cylinder 35 to retract its piston rod 36 to raise it upwards as viewed in the drawing, the piston rod 36 causes the valve body actuating rod 15 secured thereto to raise the valve body 10 upwards through the valve body pressing member 13' and coil springs 14' to a position where the valve body 10 does not interfere with the openings 2, 2' of the valve housing 1, revealing a completely open state of the valve body.

Inversely, in order to operate the valve body 10, which is in a completely open state, to prevent the communication of the openings 2, 2' formed in the valve housing 1 with each other, first the air cylinder 35 is actuated so as to bring the valve body 10 into the state shown in FIGS. 5 and 6 through the piston rod 36 of the air cylinder 35 and the valve body actuating rod 15, valve body pressing member 13' and coil springs 14'. In this state, the piston rod 36 of the air cylinder 35 is at its maximum extended stroke, and the outer edges of the vertical leg members $20_2$ of the swing frame 20 are substantially in parallel with the vertical plane passing through the centers of the pins 25 which are mounted to the rectangular support plates $5_1$ and $5_2$ constituting the support columns 5, respectively, and the piston rods 41 of the air cylinders 40 are at their retracted strokes.

At this point, as the second stage of closing, upon actuation of the air cylinders 40 to move their piston rods 41 towards the ends of their maximum extended strokes, the respective piston rods 41 push the intersecting points of the horizontal arm member $20_1$ and the vertical leg members $20_2$ constituting the swing frame 20 through the pressing members 42 so that the swing frame 20 is caused to be rotated counter clockwise as viewed in FIG. 6 about the pins 25. Accordingly, the horizontal arm member $20_1$ of the swing frame 20 causes the valve body actuating rod 15 which is connected to the piston rod 36 of the air cylinder 35 secured to the horizontal arm member $20_1$ to rotate counter clockwise as viewed in FIG. 6 together with the air cylinder 35, resulting in the valve body pressing member 13' which is centrally secured to the lower end of the valve body actuating rod 15 pressing the the bottom of the depression $10_1$ formed in the valve body 10 by the apex of the semi-spherical head $50_1$, of the bolt 50 which connects the valve body actuating rod 15 to the valve body pressing member 13'. Therefore, the valve body 10 is urged against the valve seat 3 so that the O-ring 11 mounted to the valve body 10 is pressed on the valve seat 3 by strong force, carrying out a perfect sealing action between the valve body 10 and the valve seat 3 to perfectly prevent the mutual communication between the openings 2 and 2' formed in the valve housing 1. In this case, since the valve body 10 is connected to the valve body pressing member 13' through several coil spring 14' the force on the valve seat 3 is uniformly distributed over the contact surfaces between the valve seat 3 and the valve body 10.

Inversely, in order to separate the valve body 10 from the valve seat 3 the air cylinders 40 are first actuated to retract their piston rods 41 to rotate the swing frame 20 about the pins 25 in the clockwise direction as viewed in FIG. 6 by the action of restoring coil springs 45, which are disposed between the leg members $20_2$ of the swing frame 20 and the top wall $1_0$ of the valve housing 1 by any suitable means, to arrive at the state shown in FIGS. 5 and 6. Therefore, the air cylinder 35 integral with the horizontal arm member $20_1$ of the swing frame 20, and thus the valve body actuating rod 15 connected to its piston rod 36 is made to assume the state as shown in these drawings, separating the valve body 10 from the valve seat 3. Thereafter, as the second stage of opening the air cylinder 35 is actuated to retract its piston rod 36 so that the valve body 10 is moved vertically upwards.

Thus, in the gate valve in accordance with the second embodiment, in order to effect a communication or a block between the openings 2 and 2' two kinds of movements must be imparted for the openings or closing of the opening 2. That is, one of the movements is to move the valve body 10 from a position closing the opening 2 to a position where as shown in FIG. 6 the valve body 10 is positioned opposite the opening 2 and spaced apart therefrom, or to move it from the position shown in FIG. 6 to a position where the valve body 10 closes the opening 2, while the other of the movements is to move the valve body 10 from the position shown in FIG. 6 upwards to a position where the valve body 10 allows perfect communication between the openings 2 and 2', or to move the valve body 10 downwards from this position to the position shown in FIG. 6 where the valve body 10 is aligned with the openings 2 and 2'. These movements are all carried out by the mechanism provided outside the valve housing 1, i.e. various elements such as the swing frame 20, air cylinder 35 and air cylinders 40. Further, during these movements there is no relative frictional movement between the valve body 10 and the valve seat 3 within the valve housing 1, the inside thereof being always maintained in a clean condition.

Also, in this embodiment the force necessary for the two movements of the valve body 10 is identical to that in the first embodiment.

The principal differences in constitution between the first and second embodiments reside in that in the latter only one single swing frame is necessary for effecting the two movements in contrast with the former in which two swing frames, i.e. inner and outer swing frames are required, and that in the latter the valve body is connected to the valve body pressing member through several sets of coil springs and the valve body pressing member is connected to the valve body actuating rod, whereas in the former the valve body is mounted to the valve body mounting plates through a pair of bellows and the valve body mounting plates are connected to the valve body actuating rod.

With these differences in constitution the second embodiment is superior to the first one in the points that the overall dimensions of the former are considerably smaller than the latter, and the pressing force of the valve body on the valve seat is more uniformly distributed over the valve seat than in the latter.

Although in the above the present invention has been exemplified and shown as having rectangular openings in the valve housing, with relatively longer edges in the horizontal direction as mostly used in transfer systems for manufacturing semiconductor wafers, the gate valve in accordance with the present invention may, of course, be applicable to those gate valves having openings of circular configuration, etc. and also to gate valves for vacuum apparatuses such as accelerators.

It is to be understood that although certain forms of the present invention have been illustrated and described, it is not intended to be limited thereto except insofar as such limitations are included in the following claims.

What is claimed is:

1. In a non-sliding vacuum gate valve including a valve housing, the inside of which can be held hermetically sealed from the outside, having an opening formed in one of its side walls, and a valve body disposed within said valve housing and adapted to sealingly open or close a valve seat formed around said opening, the improvement wherein a mechanism for moving said valve body to sealingly open or close said opening formed in said valve body is provided outside said valve housing, said mechanism being capable of carrying out two sequential movements, one to move said valve body in a direction substantially perpendicular to said valve seat, and the other to move said valve body substantially orthogonal to said substantially perpendicular direction with said valve body being spaced apart from said valve seat during said orthogonal movement; said mechanism comprising a valve body actuating rod means connected to said valve body within said valve housing and loosely passing therethrough so as to elongate in a direction substantially orthogonal to said movement of said valve body substantially perpendicular to said valve seat, a swing frame means disposed outside said valve housing and comprising a horizontal arm member centrally connecting said valve body actuating rod means and a pair of leg members each vertically suspended from each end of said arm member, a fluid cylinder means secured to said arm member of said swing frame means so as to have a central axis coinciding with the center line of said valve body actuating rod means with its piston rod being connected thereto, a pair of support column means secured to said valve housing and elongating is parallel with said elongating direction of said valve body actuating rod means, a pair of fluid cylinders each secured to said support column means, respectively, and each arranged so as to push the respective ends of said horizontal arm member of said swing frame means, and pin means each swingably connecting the respective lower portions of said leg members of said swing frame means to said support column means.

2. A non-sliding vacuum gate valve as claimed in claim 1, wherein said valve body is resiliently connected to a valve body pressing member secured centrally to the lower end of said valve body actuating rod means, and said valve body pressing member is adapted to press said valve body at substantially its center portion.

3. A non-sliding vacuum gate valve as claimed in claim 2, wherein said valve body is resiliently connected to said valve body pressing member by means of a set of coil springs disposed between said valve body and said valve body pressing member.

* * * * *